United States Patent
Maniloff et al.

(10) Patent No.: US 10,935,742 B2
(45) Date of Patent: Mar. 2, 2021

(54) PLUGGABLE OPTICAL MODULE THERMAL MANAGEMENT AND HEAT SHIELD ASSEMBLIES, DEVICES, AND METHODS

(71) Applicant: Ciena Corporation, Hanover, MD (US)

(72) Inventors: Eric Maniloff, Stittsville (CA); Victor Aldea, Ottawa (CA); Terence Graham, Ottawa (CA); Bonnie Lynne Mack, Carp (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/653,248

(22) Filed: Oct. 15, 2019

(65) Prior Publication Data
US 2020/0271878 A1    Aug. 27, 2020

Related U.S. Application Data (62) Division of application No. 16/287,266, filed on Feb. 27, 2019, now Pat. No. 10,852,497.

(51) Int. Cl.
*G02B 6/42*    (2006.01)

(52) U.S. Cl.
CPC ......... *G02B 6/4296* (2013.01); *G02B 6/4273* (2013.01); *G02B 6/4278* (2013.01); *G02B 2006/4297* (2013.01)

(58) Field of Classification Search
CPC .. G02B 6/4296; G02B 6/4273; G02B 6/4278; G02B 2006/4297
See application file for complete search history.

(56) References Cited

U.S. PATENT DOCUMENTS

| | | | |
|---|---|---|---|
| 9,295,178 B1 | 3/2016 | Aldea et al. | |
| 10,062,993 B1 | 8/2018 | Lutkiewicz et al. | |
| 2007/0064397 A1* | 3/2007 | Chiba | G06F 1/1632 361/702 |
| 2012/0033922 A1* | 2/2012 | Nakagawa | G02B 6/3879 385/78 |
| 2015/0013936 A1 | 1/2015 | Mack | |
| 2016/0254623 A1* | 9/2016 | Creusen | H01R 24/62 439/366 |

FOREIGN PATENT DOCUMENTS

JP    2009031455 A    2/2009

OTHER PUBLICATIONS

Jun. 26, 2020, International Search Report and Written Opinion for International Application No. PCT/US2020/019412.

* cited by examiner

*Primary Examiner* — Peter Radkowski
(74) *Attorney, Agent, or Firm* — Clements Bernard Walker; Lawrence A. Baratta, Jr.; Christopher L. Bernard (57) ABSTRACT

The present disclosure provides pluggable optical modules that are prevented from reaching potentially dangerous temperatures when a fiber optic connector is not present and engaged with the associated module housing. Further, the present disclosure provides fiber optic connectors and/or pluggable optical modules that incorporate a port heat shield external to the associated face plate when the pluggable optical modules and fiber optic connectors are engaged, thereby preventing a user from contacting potentially hot and dangerous metallic surfaces of the module housings, as well as providing access for cooling air flow. The solutions presented herein are equally applicable to fixed optical ports and connectors as well.

20 Claims, 5 Drawing Sheets

PLUGGABLE OPTICAL MODULE THERMAL MANAGEMENT AND HEAT SHIELD ASSEMBLIES, DEVICES, AND METHODS

CROSS-REFERENCE TO RELATED APPLICATION(S)

The present disclosure is a divisional of U.S. patent application Ser. No. 16/287,266, filed Feb. 27, 2019, and entitled "Pluggable optical module thermal management and heat shield assemblies, devices, and methods," the contents of which are incorporated herein by reference.

TECHNICAL FIELD

The present disclosure relates generally to the telecommunications and optical networking fields. More specifically, the present disclosure relates to pluggable optical module thermal management and heat shield assemblies, devices, and methods.

BACKGROUND ART

Pluggable optical modules, such as Quad Small Form Factor Pluggable (QSFP)-28 transceiver modules, QSFP-Double Density (DD) transceiver modules, and the like, are continually being driven to higher capacities and smaller sizes and, as a result, are continually being required to withstand higher thermal densities. For example, QSFP modules have evolved from 4-Gb/s rates to 100-Gb/s rates, and new ports supporting both QSFP and 400-Gb/s QSFP-DD modules are now available. Ports that were previously designed for 3.5-W power dissipation are now required to accommodate 12-18 W optical modules. Further, in order to provide dual-use ports that can accommodate both QSFP-28 and QSFP-DD modules, for example, a considerable portion of the housings of these modules must often protrude outside of the associated face plate. For example, ports supporting QSFP-DD modules are required to support module housings that protrude by varying amounts, as well as supporting legacy module housings that sit flush with the associated face plate.

This combination of increased power dissipation in a module housing that extends beyond the associated face plate results in a potential safety concern when the module housing temperature exceeds 50 degrees C., as such elevated temperatures can injure a user. The typical specification for maximum module housing temperature is 70 degrees C., although some modules are designed to tolerate 75-degree C. housing temperatures for short term operation. Hardened optical modules may be designed to tolerate maximum module housing temperatures as high as 85 degrees C. when operated in extreme environmental conditions. Under any of these circumstances, inserting or removing an optical fiber into or from the metal surfaces of such a module housing presents a significant safety concern.

As a result, there is a need in the art for pluggable optical modules that are prevented from reaching potentially dangerous temperatures when a fiber optic connector is not present and engaged with the associated module housing. Further, there is a need in the art for pluggable optical modules and/or fiber optic connectors that incorporate a port heat shield external to the associated face plate when the pluggable optical modules and fiber optic connectors are engaged, thereby preventing a user from contacting potentially hot and dangerous metallic surfaces of the module housings, as well as providing access for cooling air flow.

SUMMARY

Accordingly, the pluggable optical module of the present disclosure includes a port configured to selectively receive a fiber optic connector that incorporates an optional fiber connector detection mechanism. This fiber connector detection mechanism automatically transitions the pluggable optical module from a high power state when the fiber optic connector is present and engaged with the port of the pluggable optical module to a low power state when the fiber optic connector is otherwise disengaged from the port of the pluggable optical module, thereby limiting the module housing temperature when the fiber optic connector is disengaged from the port of the pluggable optical module. The fiber connector detection mechanism includes a mechanical, magnetic, electrical, and/or optical fiber connector detection mechanism that is actuated by the presence/absence of the fiber optic ferrule, connector housing, and/or spring loaded connector latch mechanism when the fiber optic connector is engaged with/disengaged from the port of the pluggable optical module.

In one exemplary embodiment, the present disclosure provides a pluggable optical module, including: a housing defining a port adapted to selectively receive a fiber optic connector; and a fiber connector detection mechanism coupled to the housing and disposed one of within and adjacent to the port; wherein the fiber connector detection mechanism is adapted to be actuated by one or more of insertion of the fiber optic connector into the port and removal of the fiber optic connector from the port and transitioning the pluggable optical module between a low power operating state and a high power operating state accordingly. Optionally, the fiber connector detection mechanism includes a mechanical detection mechanism adapted to be actuated via contact with one or more physical surfaces associated with an end portion of the fiber optic connector. Alternatively, the fiber connector detection mechanism includes an electrical detection mechanism adapted to be actuated via contact with one or more conductive surfaces associated with an end portion of the fiber optic connector. Alternatively, the fiber connector detection mechanism includes an optical detection mechanism adapted to be actuated via interaction with one or more physical surfaces associated with an end portion of the fiber optic connector. Alternatively, the fiber connector detection mechanism includes a mechanical or magnetic sensor. Optionally, the low power operating state is a laser-off operating state.

In another exemplary embodiment, the present disclosure provides a method for managing the power operating state of a pluggable optical module, including: operating the pluggable optical module in a high power operating state when a fiber optic connector is engaged with a port defined by a housing of the pluggable optical module; operating the pluggable optical module in a low power operating state when the fiber optic connector is disengaged from the port defined by the housing of the pluggable optical module; and selectively transitioning the pluggable optical module between the high power operating state and the low power operating state upon the insertion/removal of the fiber optic connector into/from the port defined by the housing of the pluggable optical module, where the housing of the pluggable optical module includes a fiber connector detection mechanism disposed one of within and adjacent to the port, and where the fiber connector detection mechanism is adapted to be actuated by the insertion/removal of the fiber optic connector into/from the port, thereby transitioning the pluggable optical module between the high power operating state and the low power operating state. Optionally, the fiber connector detection mechanism includes a mechanical detection mechanism adapted to be actuated via contact with one or more physical surfaces associated with an end portion of the fiber optic connector. Alternatively, the fiber connector detection mechanism includes an electrical detection mechanism adapted to be actuated via contact with one or more conductive surfaces associated with an end portion of the fiber optic connector. Alternatively, the fiber connector detection mechanism includes an optical detection mechanism adapted to be actuated via interaction with one or more physical surfaces associated with an end portion of the fiber optic connector. Alternatively, the fiber connector detection mechanism includes a mechanical or magnetic sensor. Optionally, the low power operating state is a laser-off operating state.

Accordingly, the fiber optic connector and/or pluggable optical module of the present disclosure also includes a separate port heat shield disposed external to the associated face plate when the pluggable optical module and fiber optic connector are engaged, thereby preventing a user from contacting potentially hot and dangerous metallic surfaces of the module housing, as well as providing access for cooling air flow. Optionally, the heat shield can be deployed as part of the fiber optic connector or patch cord. When the fiber optic connector is engaged with the port of the pluggable optical module (or other port), the heat shield provides protection for the portion of the housing protruding from or otherwise accessible through the associated face plate. A meshed structure or appropriate holes, for example, are utilized to provide the cooling air flow access. The exact configuration of the heat shield is dependent upon the specific module packaging and application. For example, for belly-to-belly mounted modules in a router configuration, shielding on a single surface of the fiber optic connector may be sufficient, while for transponder applications, it may be desirable to shield multiple surfaces of the fiber optic connector. The heat shield can be formed as part of the fiber optic connector itself, or may simply be coupled to the fiber optic connector. This may necessitate the use of a longer connector spring retention mechanism than is typically utilized, or the use of pull-tab type connector latch mechanism, well known to those of ordinary skill in the art. Alternatively, the connector spring retention mechanism can be coupled to and/or actuated through the heat shield. It is also contemplated herein that the heat shield can be a separate component from the fiber optic connector and/or can be coupled to the pluggable optical module and/or associated face plate. For modules without a separable optical connector, the heat shield could be integrated into the module pull-tab, and the module pull-tabs could be used essentially as side heat shields. In any event, this heat shield concept is becoming more and more important as higher power pluggable coherent modules are becoming more and more prevalent.

In a further exemplary embodiment, the present disclosure provides a fiber optic connector and optical module heat shield assembly, including: an isolating clip structure including a retention portion one of fixedly and removably coupled to an end portion of the fiber optic connector and a protection portion adapted to be one of fixedly and removably disposed about an exposed end portion of the optical module; wherein the isolating clip structure defines a protective envelope about a port interface between the fiber optic connector and the optical module and the exposed end portion of the optical module. The protection portion of the isolating clip structure is adapted to be one of fixedly and removably disposed about one or more of an exposed top surface, and exposed bottom surface, and an exposed side surface of the optical module. The retention portion of the isolating clip structure is adapted to receive the end portion of the fiber optic connector therethrough. Optionally, the retention portion of the isolating clip structure is disposed at an angle with respect to the protection portion of the isolating clip structure.

In a still further exemplary embodiment, the present disclosure provides a heat shield device for use with a fiber optic connector and an optical module, including: an isolating clip structure including a retention portion adapted to receive an end portion of the fiber optic connector and a protection portion adapted to be disposed about an exposed end portion of the optical module; wherein the isolating clip structure defines a protective envelope about a port interface between the fiber optic connector and the optical module and the exposed end portion of the optical module. The protection portion of the isolating clip structure is adapted to be disposed about one or more of an exposed top surface, and exposed bottom surface, and an exposed side surface of the optical module. The retention portion of the isolating clip structure is adapted to receive the end portion of the fiber optic connector therethrough. Optionally, the retention portion of the isolating clip structure is disposed at an angle with respect to the protection portion of the isolating clip structure.

BRIEF DESCRIPTION OF THE DRAWINGS

The assemblies, devices, and methods of the present disclosure are illustrated and described herein with reference to the various drawings, in which like reference numbers are used to denote like assembly/device components and/or method steps, as appropriate, and in which.

DESCRIPTION OF EMBODIMENTS

Again, the pluggable optical module of the present disclosure includes a port configured to selectively receive a fiber optic connector that incorporates an optional fiber connector detection mechanism. This fiber connector detection mechanism automatically transitions the pluggable optical module from a high power state when the fiber optic connector is present and engaged with the port of the pluggable optical module to a low power state when the fiber optic connector is otherwise disengaged from the port of the pluggable optical module, thereby limiting the module housing temperature when the fiber optic connector is disengaged from the port of the pluggable optical module. The fiber connector detection mechanism includes a mechanical, magnetic, electrical, and/or optical fiber connector detection mechanism that is actuated by the presence/absence of the fiber optic ferrule, connector housing, and/or spring loaded connector latch mechanism when the fiber optic connector is engaged with/disengaged from the port of the pluggable optical module.

Figure 1A:
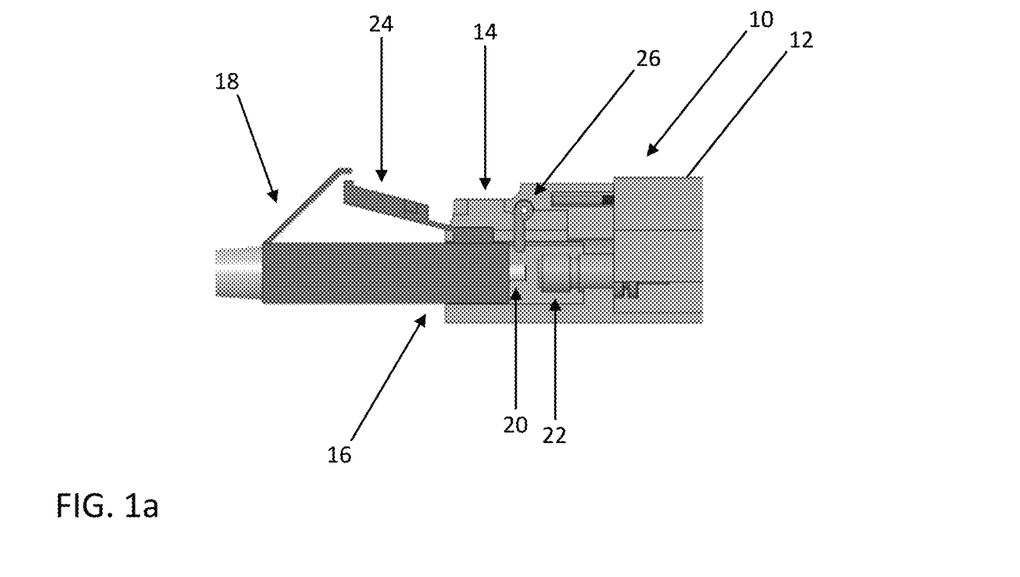
FIGS. 1*a* and 1*b* are planar side views illustrating one exemplary embodiment of the pluggable optical module/fiber optic connector fiber connector detection mechanism of the present disclosure in unactuated and actuated configurations, thereby transitioning the pluggable optical module from a low power-low temperature state to a high power-high temperature state, respectively.
Figure 1B:
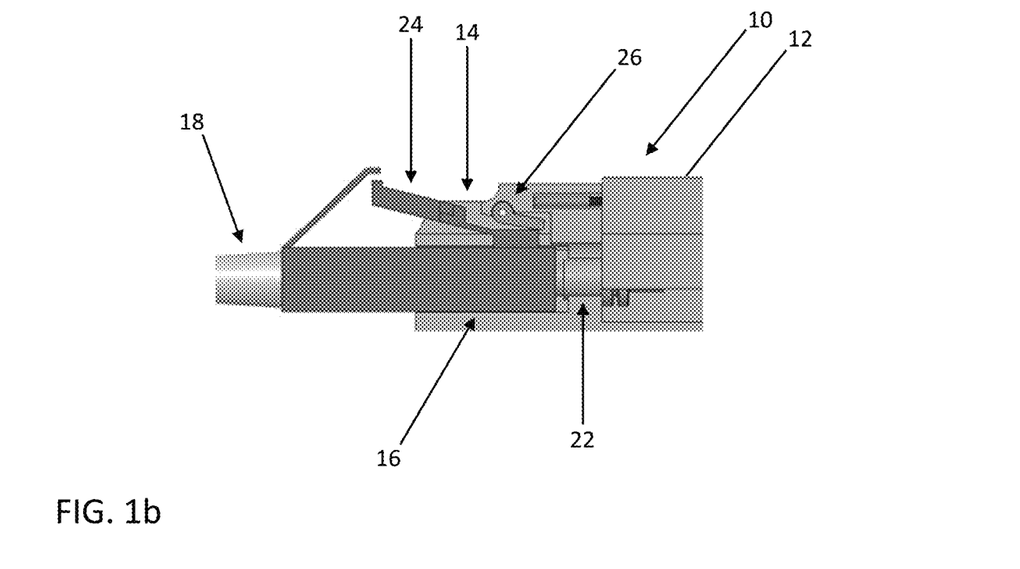

Referring now specifically to FIGS. 1a and 1b, in one exemplary embodiment, the pluggable optical module 10 includes a housing 12 that defines a port 14 that is configured and adapted to selectively and securely receive the end portion 16 of a fiber optic connector 18, such as an LC connector or the like, well known to those of ordinary skill in the art. When the fiber optic connector 18 is engaged with the pluggable optical module, the optical fiber 20 of the fiber optic connector 18 is optically coupled to the optical fiber 22 of the pluggable optical module 10, such that optical signals may be communicated between and through the two. Of course, each fiber optic connector 18 and port 14 can similarly couple multiple optical fibers 20,22 simultaneously. Typically, the fiber optic connector 18 is introduced into and secured to/released from the port 14 via the actuation of a spring retention mechanism 24 or the like, well known to those of ordinary skill in the art.

At the opening of the port 14 or within an interior portion of the port 14, the fiber connector detection mechanism 26 is provided. In a mechanical arrangement, the fiber connector detection mechanism 26 includes a pivotable arm or push pin that is displaced by the fiber optic connector 18 when the fiber optic connector 18 is inserted into the port 14. This actuation triggers a control mechanism or algorithm that transitions the pluggable optical module 10 from a low power state to a high power state, causing the intensity of the optical signal, and the corresponding temperature of the housing 12 of the pluggable optical module 10, to be increased. Alternately, when the fiber optic connector 18 is removed from the port 14, the fiber connector detection mechanism 26 is actuated to transition the pluggable optical module 10 from the high power state to the low power state, causing the intensity of the optical signal, and the corresponding temperature of the housing 12 of the pluggable optical module 10, to be decreased. The control mechanism or algorithm may involve mechanical and/or software-based control. FIG. 1a illustrates the fiber connector detection mechanism 26 in an unactuated configuration, with the fiber optic connector 18 partially disengaged from the port 14. FIG. 1b illustrates the fiber connector detection mechanism 26 in an actuated configuration, with the fiber optic connector 18 engaged with the port 14.

The fiber connector detection mechanism 26 could also utilize a magnet coupled to the fiber optic connector 18 or displaced by the fiber optic connector 18 that is sensed by a magnetic sensor or the like present in or adjacent to the port. The fiber connector detection mechanism 26 could further utilize a mechanical connection between the fiber optic connector 18 and the pluggable optical module 10 that closes an internal electrical or optical detection associated with the pluggable optical module 10. The fiber connector detection mechanism 26 could still further utilize a sensor that senses optical fiber 20,22 displacement when the fiber optic connector 18 is engaged with/removed from the port 14. It will be readily apparent to those of ordinary skill in the art that any suitable type of fiber connector detection mechanism 26, whether mechanical, electrical, and/or optical, could be utilized equally, provided that the insertion of the fiber optic connector 18 into or removable of the fiber optic connector 18 from the port 14 of the pluggable optical module 10 causes the corresponding transition of the pluggable optical module 10 between the low power state and the high power state. For example, the fiber optic connector 18 could close a connection via insertion through a spring loaded dust cover disposed over the port 14 or the like.

Although the focus of the present disclosure is primarily directed to protecting a user from hot surfaces associated with the housing 12 of the pluggable optical module 10, via the transition of the pluggable optical module 10 from a high power state to a low power state when the fiber optic connector 18 is removed from the port 14, this same fiber connector detection mechanism 26 could be used to address laser safety as well, providing automatic shutdown of the associated laser when the fiber optic connector 18 is removed from the port 14 and the fiber connector detection mechanism 26 is actuated accordingly. The functionality provided herein can be programmed using a management interface, and can be incorporated into a fixed optical port, as well as the pluggable optical module port 14 illustrated. The functionality provided herein finds particular applicability with QSFP-DD pluggable optical modules and the like, where the current state-of-the-art user protection methodology is the use of warning labels on face plates, providing no physical user protection. When a user removes a fiber optic connector 18 from a port 14 there is currently significant risk of contact with hot surfaces.

Again, the fiber optic connector and/or pluggable optical module of the present disclosure also includes a port heat shield disposed external to the associated face plate when the pluggable optical module and fiber optic connector are engaged, thereby preventing a user from contacting potentially hot and dangerous metallic surfaces of the module housing, as well as providing access for cooling air flow. Optionally, the heat shield can be deployed as part of the fiber optic connector or patch cord. When the fiber optic connector is engaged with the port of the pluggable optical module (or other port), the heat shield provides protection for the portion of the housing protruding from or otherwise accessible through the associated face plate. A meshed structure or appropriate holes are utilized to provide the cooling air flow access. The exact configuration of the heat shield is dependent upon the specific module packaging and application. For example, for belly-to-belly mounted modules in a router configuration, shielding on a single surface of the fiber optic connector may be sufficient, while for transponder applications, it may be desirable to shield multiple surfaces of the fiber optic connector. The heat shield can be formed as part of the fiber optic connector itself, or may simply be coupled to the fiber optic connector. This may necessitate the use of a longer connector spring retention mechanism than is typically utilized, or the use of pull-tab type connector latch mechanism, well known to those of ordinary skill in the art. Alternatively, the connector spring retention mechanism can be coupled to and/or actuated through the heat shield. It is also contemplated herein that the heat shield can be a separate component from the fiber optic connector and/or can be coupled to the pluggable optical module and/or associated face plate. For modules without a separable optical connector, the heat shield could be integrated into the module pull-tab, and the module pull-tabs could be used essentially as side heat shields. In any event, this heat shield concept is becoming more and more important as higher power pluggable coherent modules are becoming more and more prevalent.

Figure 2:
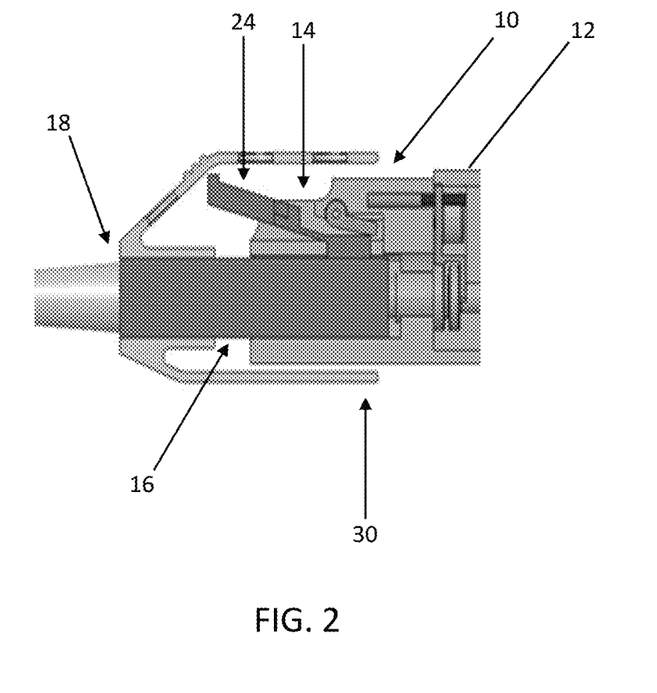
FIG. 2 is a planar side view illustrating one exemplary embodiment of the fiber optic connector and/or pluggable optical module of the present disclosure incorporating a protective heat shield that encompasses any portion of the module housing that protrudes from the associated face plate when the fiber optic connector is engaged with the pluggable optical module.

Referring now specifically to FIG. 2, in one exemplary embodiment, the heat shield 30 provided herein is fixedly or removably coupled to the end portion 16 of the fiber optic connector 18 and surrounds the portion of the housing 12 of the pluggable optical module 10 that protrudes from the associated face plate when the fiber optic connector 18 is engaged with the port 14 of the pluggable optical module 10. In the exemplary embodiment illustrated, the heat shield 30 covers both the top and bottom protruding surfaces of the housing 12, although it may cover the top protruding surface or the bottom protruding surface alone, and it may also cover the side protruding surfaces. The heat shield 30 can be fixedly or removably coupled to the end portion 16 of the fiber optic connector 18 itself, the associated patch cord, or the associated latch mechanism 24 that secures the fiber optic connector 18 in the port 14 of the pluggable optical module 10. Alternatively (or in addition), the heat shield 30 can be fixedly or removably coupled to one or more of the protruding surfaces of the housing 12 of the pluggable optical module 10 and/or the associated faceplate. Thus, in general, the heat shield 30 is disposed about the interface of the fiber optic connector 18 and the port 14 of the pluggable optical module 10, shielding the protruding surfaces of the housing 12 of the pluggable optical module 10 from user contact, regardless of which structures the heat shield 30 is actually coupled to. In the event that a fixed port is used, with a fixed fiber optic line, the heat shield 30 may be similarly disposed, protecting any protruding metallic surfaces around the fixed port from user contact. The heat shield 30 is most simply manufactured from an insulating plastic material or the like that is not prone to heating up. Additionally, it may be enhanced by inclusion of selective surface treatments to reduce conductive and/or radiative heat transfer from the module/transponder to the heat shield 30. Such treatments may include surface contouring on a micro or macro scale to increase contact resistance on mating surfaces, the use of non-absorbing surface treatments or materials that limit radiation heat transfer, and the inclusion of thermally resistive materials in contact locations, while outer portions may selectively utilize conductive material to reduce temperatures where personnel contact the heat shield 30.

Figure 3:
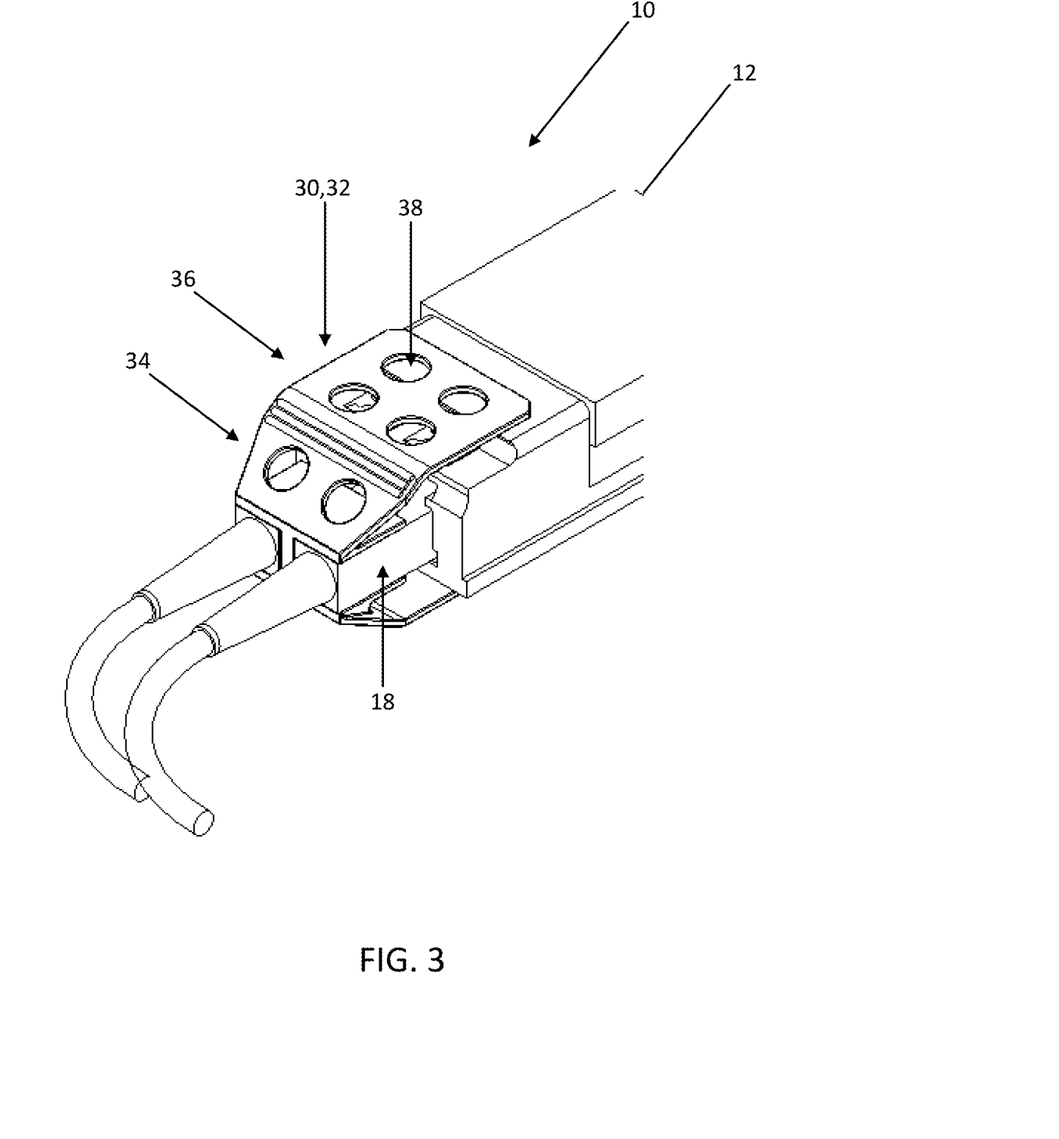
FIG. 3 is a perspective view illustrating one exemplary embodiment of the fiber optic connector protective heat shield of the present disclosure, simultaneously engaged with both a fiber optic connector and a module housing.
Figure 4:
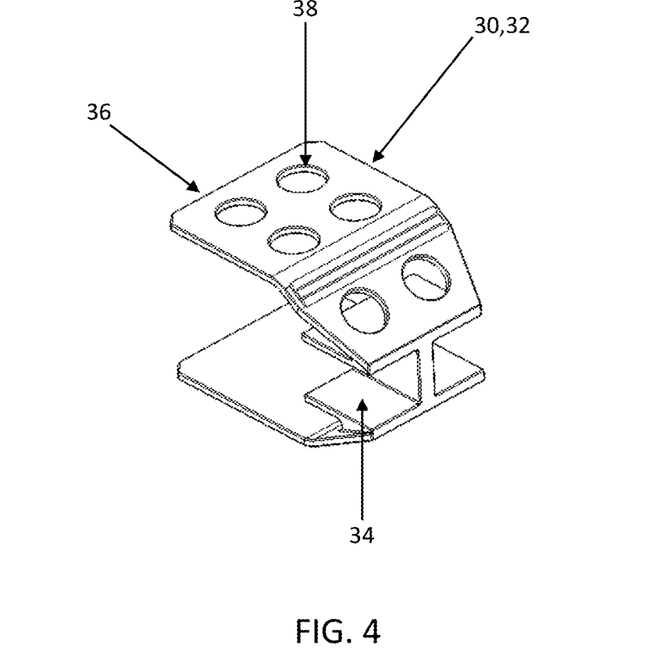
FIG. 4 is a perspective view illustrating the fiber optic connector protective heat shield of FIG. 3 in isolation.

Referring now specifically to FIGS. 3 and 4, in one specific exemplary embodiment, the heat shield 30 includes an isolating clip structure 32 that has a fiber optic connector retention portion 34 adapted to receive and retain one or more fiber optic connectors 18. For example, the one or more fiber optic connectors 18 can be "snapped" into the fiber optic connector retention portion 34. The isolating clip structure 32 also has a housing protection portion 36 that is adapted to engage and surround one or more protruding surfaces of the housing 12 of the pluggable optical module 10. In the embodiment illustrated, the housing protection portion 36 engages and surrounds the top and bottom protruding surfaces of the housing 12, but not the side protruding surfaces. In this sense, the isolating clip structure 32 retains a pair of fiber optic connectors 18, for example, and then "clips" about the protruding portion of the housing 12 when the pair of fiber optic connectors 18 are engaged with the pluggable optical module 10, especially when the pluggable optical module is in a high power, high temperature operating state. Accordingly, the isolating clip structure 32 defines one or more thru holes 38 that allow a cooling air flow to penetrate the heat shield 30 and reach the protruding portion of the housing 12.

Figure 5A:
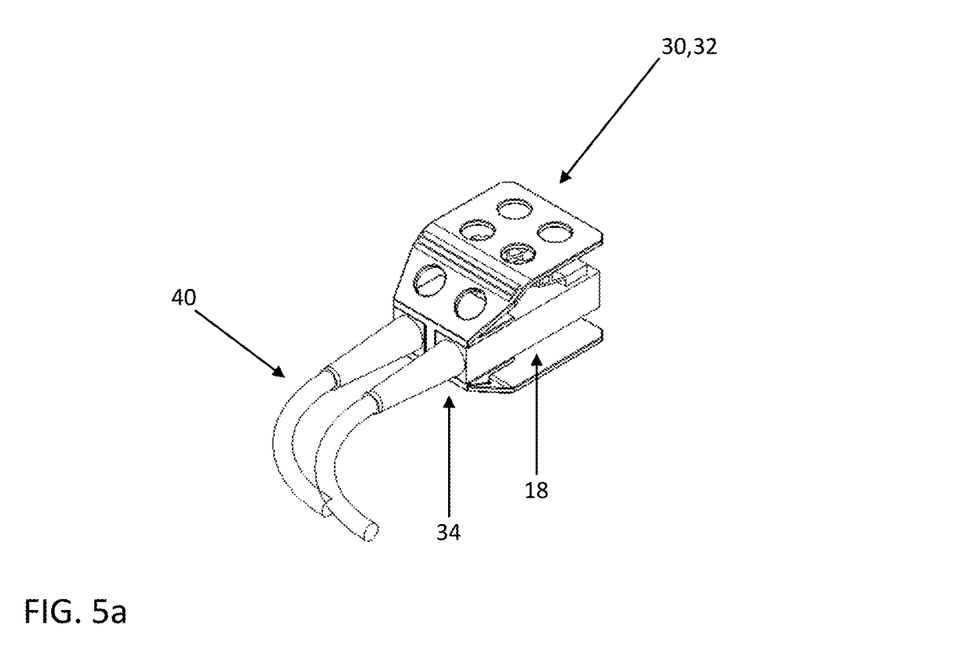
FIGS. 5*a* and 5*b* are perspective views illustrating the fiber optic connector protective heat shield of FIGS. 3 and 4 with and without a fiber optic connector engaged, respectively.
Figure 5B:
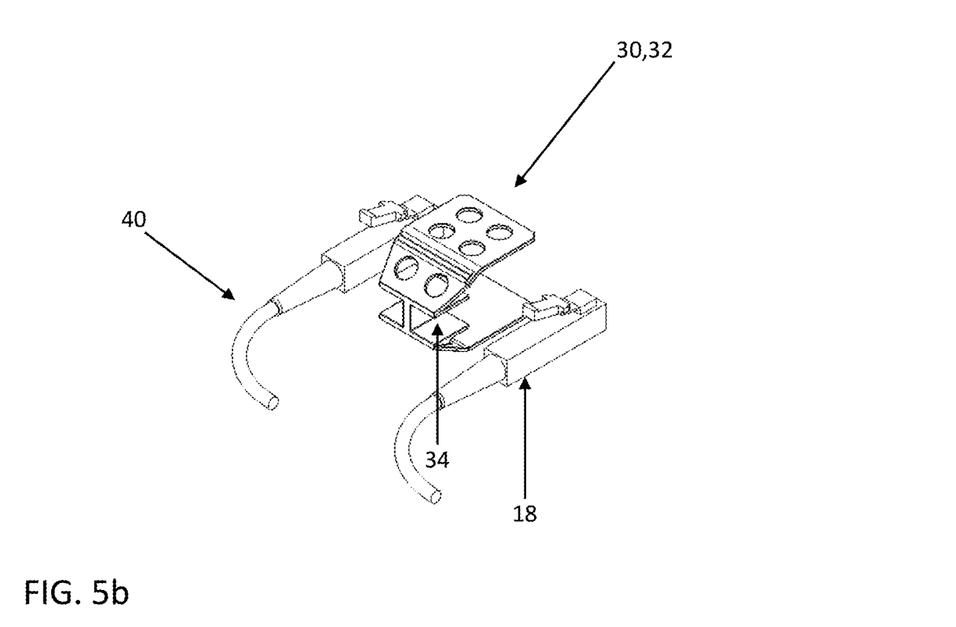

FIG. 5a illustrates the isolating clip structure 32 with the pair of fiber optic connectors 18 secured in the fiber optic connector retention portion 34. FIG. 5b illustrates the isolating clip structure 32 with the pair of fiber optic connectors 18 disengaged from the fiber optic connector retention portion 34. It should be noted that the fiber optic connector retention portion 34 of the isolating clip structure 32 can be formed to substantially conform to the shape of the retained fiber optic connector(s) 18, or the fiber optic connector retention portion 34 of the isolating clip structure 32 can be integrally formed with the retained fiber optic connector(s) 18. The isolating clip structure 32 can also be coupled to the patch cord(s) 40 of the fiber optic connector(s) 18.

As alluded to herein above, the isolating clip structure 32 can alternatively be coupled to one or more of the pluggable optical module 10 (FIG. 3) and the associated face plate, with the fiber optic connector(s) 18 simply passing through the heat shield 30 to engage the pluggable optical module 10, provided that the interface between the two is shielded from user contact.

Again, the heat shield assemblies and devices provided herein find particular applicability with QSFP-DD pluggable optical modules and the like, where the current state-of-the-art user protection methodology is the use of warning labels on face plates, providing no physical user protection. When a user removes a fiber optic connector 18 from a port 14 there is currently significant risk of contact with hot surfaces.

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims for all purposes.

What is claimed is:

1. A heat shield device, comprising:
   an isolating clip structure with a retention portion one of fixedly and removably coupled to an end portion of a fiber optic connector and a protection portion adapted to be one of fixedly and removably disposed about an exposed end portion of a housing of an optical module;
   wherein the isolating clip structure defines a protective envelope about a port of the optical module adapted to receive the fiber optic connector, the fiber optic connector, and the exposed end portion of the housing such that a protruding portion of the housing that includes the port is substantially surrounded thereby.

2. The heat shield device of claim 1, wherein the protection portion of the isolating clip structure is adapted to be one of fixedly and removably disposed about one or more of an exposed top surface, and exposed bottom surface, and an exposed side surface of the optical module.

3. The heat shield device of claim 1, wherein the retention portion of the isolating clip structure is adapted to receive the end portion of the fiber optic connector therethrough.

4. The heat shield device of claim 1, wherein the retention portion of the isolating clip structure is disposed at an angle with respect to the protection portion of the isolating clip structure.

5. The heat shield device of claim 1, wherein the optical module is a QSFP-DD pluggable optical module.

6. The heat shield device of claim 1, wherein the isolating clip structure includes a heat insulating material.

7. The heat shield device of claim 1, wherein the isolating clip structure includes a surface treatment to reduce one or more of conductive and radiative heat transfer from the optical module.

8. A method comprising:
providing an isolating clip structure with a retention portion one of fixedly and removably coupled to an end portion of a fiber optic connector and a protection portion adapted to be one of fixedly and removably disposed about an exposed end portion of a housing of an optical module;
positioning the isolating clip structure at a port of the housing adapted to receive the fiber optic connector such that the isolating clip structure defines a protective envelope about the port, fiber optic connector, and the exposed end portion of the housing such that a protruding portion of the housing that includes the port is substantially surrounded thereby.

9. An optical module, comprising:
a housing with a port adapted to selectively receive a fiber optic connector; and
an isolating clip structure with a retention portion one of fixedly and removably coupled to an end portion of a fiber optic connector and a protection portion adapted to be one of fixedly and removably disposed about an exposed end portion of the housing;
wherein the isolating clip structure defines a protective envelope about the port, the fiber optic connector, and the exposed end portion of the housing such that a protruding portion of the housing that includes the port is substantially surrounded thereby.

10. The optical module of claim 9, wherein the protection portion of the isolating clip structure is adapted to be one of fixedly and removably disposed about one or more of an exposed top surface, and exposed bottom surface, and an exposed side surface of the optical module.

11. The optical module of claim 9, wherein the retention portion of the isolating clip structure is adapted to receive the end portion of the fiber optic connector therethrough.

12. The optical module of claim 9, wherein the retention portion of the isolating clip structure is disposed at an angle with respect to the protection portion of the isolating clip structure.

13. The optical module of claim 9, wherein the isolating clip structure includes a heat insulating material.

14. The optical module of claim 9, wherein the isolating clip structure includes a surface treatment to reduce one or more of conductive and radiative heat transfer from the optical module.

15. The optical module of claim 9, wherein the protection portion includes one or more holes for airflow.

16. The optical module of claim 9, wherein the protection portion engages and surrounds the top and bottom protruding surfaces of the housing.

17. The optical module of claim 9, wherein the isolating clip structure is disposed about an exposed end portion of the housing while the optical module is in a high power, high temperature operating state.

18. The optical module of claim 9, wherein the optical module is a QSFP-DD pluggable optical module.

19. The heat shield device of claim 1, wherein the protection portion engages and surrounds the top and bottom protruding surfaces of the housing.

20. The heat shield device of claim 1, wherein the isolating clip structure is disposed about an exposed end portion of the housing while the optical module is in a high power, high temperature operating state.

* * * * *